United States Patent [19]

Hinton

[11] Patent Number: 5,058,724
[45] Date of Patent: Oct. 22, 1991

[54] APPARATUS AND METHOD FOR ORIENTING ARTICLES AND CONTAINERS

[76] Inventor: Gaylen R. Hinton, 4316 Buckeye La., Merced, Calif. 95348

[21] Appl. No.: 610,656

[22] Filed: Nov. 8, 1990

[51] Int. Cl.⁵ .............................................. B65G 47/24
[52] U.S. Cl. .................................... 198/376; 198/379; 198/394
[58] Field of Search ................. 198/376, 379, 394, 384

[56] References Cited

U.S. PATENT DOCUMENTS

| | | | |
|---|---|---|---|
| 2,524,700 | 10/1950 | Grant | 198/394 |
| 2,528,860 | 11/1950 | Clark | 198/394 |
| 2,843,252 | 7/1958 | Eddison et al. | 198/394 |
| 3,451,523 | 6/1969 | Evans, Jr. et al. | 198/394 |
| 3,618,743 | 11/1971 | Benatar et al. | 198/384 |
| 3,938,653 | 2/1976 | Senger | 198/379 X |
| 3,957,154 | 5/1976 | Shiba | 198/394 |
| 4,110,493 | 8/1978 | Loveless et al. | 198/394 X |
| 4,428,474 | 1/1984 | Gau et al. | 198/394 |
| 4,442,934 | 4/1984 | Dorf et al. | 198/379 |
| 4,465,111 | 8/1984 | Nalbach | 198/394 X |
| 4,497,409 | 2/1985 | Chong | 198/394 X |

FOREIGN PATENT DOCUMENTS 2607115  8/1977  Fed. Rep. of Germany ...... 198/394
2740220  3/1979  Fed. Rep. of Germany ...... 198/394

Primary Examiner—D. Glenn Dayoan
Attorney, Agent, or Firm—Lothrop & West

[57] ABSTRACT

A method and apparatus for orienting rotationally symmetrical articles and containers having an orientation reference index thereon. An infeed mechanism successively delivers containers to a rotary starwheel, preferably having a plurality of container pockets spaced about its periphery. An arcuate guide is concentric with and spaced radially outwardly from the periphery of the starwheel. A mechanism is provided within each pocket to maintain the entering containers initially in a radially extended position, in rolling engagement with the arcuate guide. A detector senses the index on the rotating container, and sends a pulse to delay circuitry. Depending upon a number of operational parameters, including overall speed of the orienter, the viscosity of the product within the containers, and whether the containers are full of product or not, the control pulse is accordingly delayed. The delayed control pulse then deactivates the mechanism, radially withdrawing the container farther into the pocket against a brake shoe. The oriented containers are subsequently labelled, packaged, or otherwise processed.

20 Claims, 7 Drawing Sheets

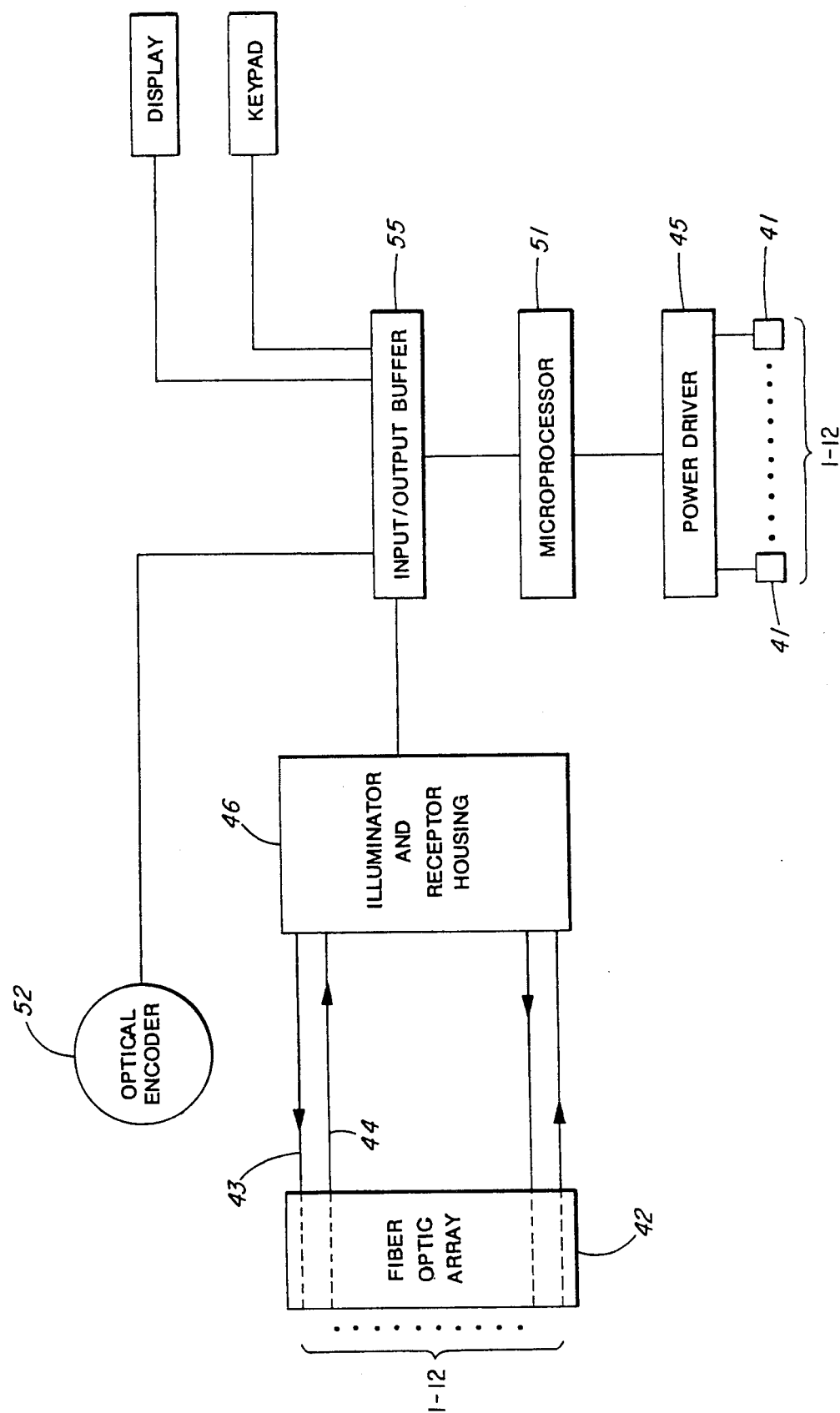

APPARATUS AND METHOD FOR ORIENTING ARTICLES AND CONTAINERS

FIELD OF THE INVENTION

The invention relates generally to systems for processing randomly oriented articles and containers into a consistent, predetermined orientation prior to labeling, packaging, fabricating, or filling these items. More specifically, the invention pertains to an apparatus and a method for orienting metal containers before they are labeled, ensuring that each can seam will be consistently oriented with respect to the subsequently attached container label. The invention also relates to speed compensation apparatus for article and container orientation devices, assuring accurate and consistent container orientation over a wide range of operating speeds, for both full and empty containers.

BACKGROUND OF THE INVENTION

The need to orient product containers arises for both functional and cosmetic reasons. For example, where the incongruous seam of a metal container must be located so as not to interfere with the subsequent addition of a fixture to the container's outer sidewall, a device to pre-orient the container can be used to advantage. U.S. Pat. No. 3,306,473, issued to McCoy illustrates container must have a particular orientation to be filled with product by means of a fill valve, having a predetermined position along a conveyor system. Thus, in Jorgensen et al., U.S. Pat. No. 3,993,199, an apparatus for automatically aligning a drum's filler fitting with a fluid fill valve, is disclosed.

It is also desirable, particularly where containers are packaged together in open-sided cartons or by means of interconnected plastic loops for six packs of beverage, to orient a selected portion of the containers outwardly, both for cosmetic purposes and for product identification. Representative prior art showing apparatus designed to so orient containers is shown in U.S. Pat. No. 3,618,743 issued to Benatar, U.S. Pat. No. 3,415,350, granted to Murphy, and in U.S. Pat. No. 3,451,523 issued to Evans, Jr., et al.

SUMMARY OF THE PRESENT INVENTION

The orienter apparatus disclosed herein is structurally and functionally integrated with a high speed labeling machine, applying either paper or plastic labels to metal containers. Prior to labeling such containers, it is desirable to pre-orient the can seam with respect to a physical or visual aspect of the label. For example, the present invention may be used advantageously to orient the container so that the label seam is formed over the can seam. Such a label seam and can seam orientation will prevent the unsightliness of the can seam bulging under or showing through the front face of the label.

Located immediately upstream from the labeling apparatus, the orienter includes a rotary starwheel, having a plurality of peripheral pockets, or arcuate cutouts, for confining and handling the containers during the orientation process. Each pocket is specially provided with its own electro-mechanical mechanism for effecting and arresting movement of the container within the pocket. This mechanism includes: a stationary idler roller on one outer side of the pocket; a pincher roller mounted on an inwardly spring biased arm pivotally mounted on the other outer side of the pocket; a pusher roller located within the pocket itself; and a brake pad, positioned on the inner sidewall of the pocket.

The pusher roller is positioned on one end of a pivotally mounted, metal lever arm. The other end of the lever arm is magnetically attracted by an electromagnet, for radially extending the pusher roller against the container. When the electromagnet is deactivated, the pusher roller radially retracts under inwardly directed pressure applied by the pincher roller against the container.

Each pocket also includes a fiber optic array, adapted to sense a reference index on the sidewall of the container. Where the container is metal, the can seam itself provides a convenient index for determining the rotational position of the can.

Cooperating with the starwheel is an arcuate container guide, concentric with the starwheel and spaced radially outwardly from its periphery. The guide extends only around a portion of the starwheel, from a container entry station to a container discharge station, adjacent the vacuum drum of the labeling apparatus.

A container infeed mechanism, typically a starwheel, a helical feedscrew, or the like, successively delivers containers having a right-circular, cylindrical configuration into the pockets of the orienter starwheel at the container entry station. Entering a pocket, the container encounters the idler roller, the radially extended pusher roller, the pincher roller, and the inner rubber wall of the arcuate container guide. The three rollers maintain the container for rotation about its longitudinal axis, while the pusher roller further maintains the container in engagement with the resilient wall of the container guide. With the orienter starwheel rotating, the friction between the container and the guide wall is sufficient to spin the container about its axis of rotational symmetry.

After the spin rate of the can has stabilized, the fiber optic array exposes and detects the seam, and through an optically responsive phototransistor, produces a control pulse. While the container continues to rotate toward the desired seam orientation, the control pulse is delayed a determined amount of time by electronic compensation circuitry. Thereafter, as explained more fully below, the delayed control pulse is passed on to an electronic driver switch, deactivating the electromagnet and quickly braking further rotation of the container.

The electronic compensation circuitry is provided appropriately to vary the delay of the control signal delivered to the electro-mechanical mechanism effecting rotation and braking of the containers. This circuitry calculates a particular delay for the control signal, by assessing data provided from several sources. For example, by continuously sampling the rotational speed of the orienter starwheel, to determine the rotational speed or velocity of the cans, the compensation circuitry enables the orienter to operate accurately and consistently over the wide range of speed encountered during labeling. Additional data, regarding the control status of the containers to be oriented and labeled, is selectively entered into programmable memory by the label machine operator. In assessing this data, the compensation circuitry introduces an appropriate delay in the operation of the electro-mechanical components to compensate for empty containers, full containers, and the viscosity of the containers' contents.

With the electromagnet deactivated at the proper time by the delayed control pulse, the lever arm for the pusher roller is released for pivotal rotation. The spring biased pincher roller then urges the container inwardly away from the container guide and against the brake shoe within the pocket. Further rotation of the container is quickly arrested, and the container is now properly oriented for labeling.

Continued rotation of the orienter starwheel brings the container into contact with the rotary vacuum drum at the discharge station. An arcuate roll-on pad, concentric with and spaced from the vacuum drum, retracts the container from the starwheel pocket while drawing it against the periphery of the vacuum drum. The container is thereby caused to pre-rotate, owing to the frictional forces between the container, the stationary roll-on pad, and the rotary vacuum drum.

In the preferred embodiment of the invention disclosed herein, the leading end of the label comes into contact with the can seam, and the label is completely wrapped around the container by the continued rotation of the can. The trailing end of the label wraps over the leading end, forming a label seam directly over the can seam. Reset circuitry reactivates the electromagnet, and the push roller is repositioned in an extended position, ready to receive the next container.

DETAILED DESCRIPTION OF THE PREFERRED EMBODIMENT

Figure 1:
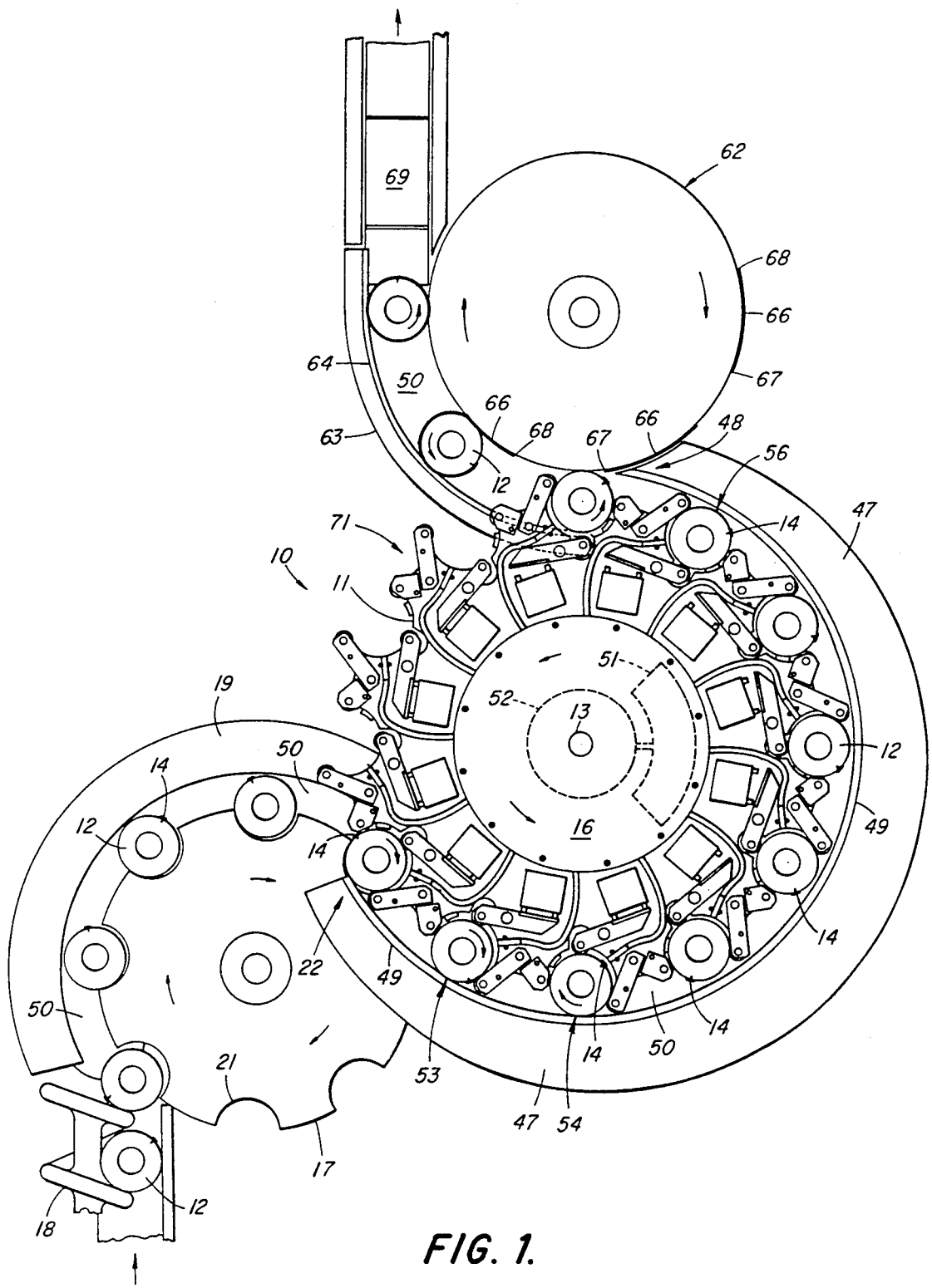
FIG. 1 is a top plan view of the container orienter, including fragmentary representations of the infeed mechanisms and the vacuum drum of the labeling apparatus.
Figure 2:
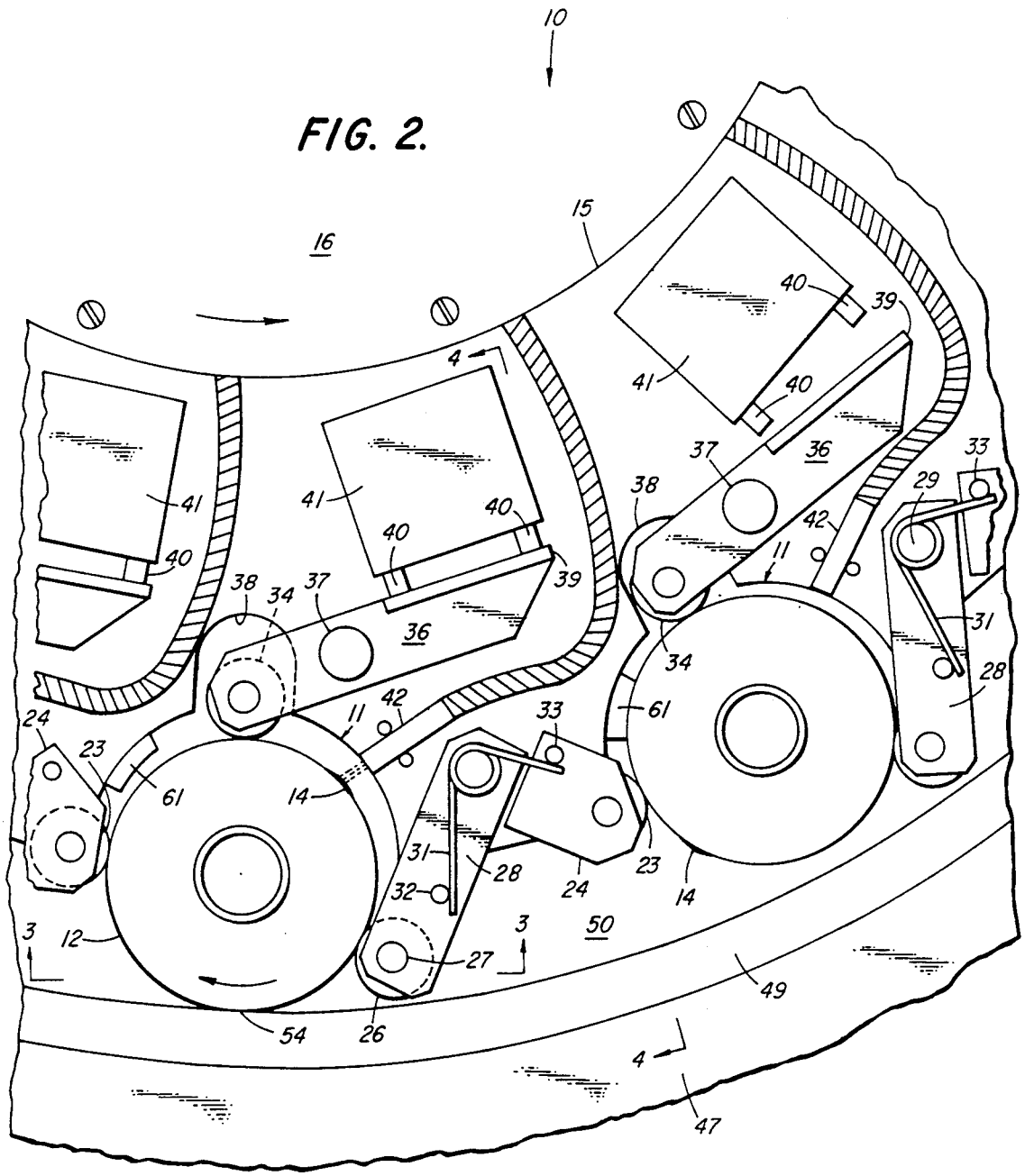
FIG. 2 is a top plan view of two pockets of the orienter starwheel, taken to an enlarged scale, showing one container in a rotating condition and the other container in an oriented, arrested condition.

Making particular reference to FIGS. 1 and 2, the invention includes a rotary orienter starwheel 10, having a plurality of pockets 11, or arcuate cutouts, equally spaced about its periphery. The pockets 11 act to confine and handle the containers 12 during the orientation process, while the starwheel 10 rotates about shaft 13 in counter-clockwise fashion. The starwheel 10 is preferably constructed from upper and lower discs 15, structurally integrated by means of a central hub 16, containing the electrical components of the container orienter.

For purposes of the present discussion, the containers 12 are unlabeled metal cans, having a longitudinal seam 14, or protrusion, extending vertically along each can's outer sidewall. As will be explained below, the function of the orienter in the preferred embodiment is to orient this can seam so that when the container is labeled, the label seam will be formed directly over the can seam. However, the orienter of the present invention can also be used advantageously to orient the label seam in any manner with respect to the can seam, or to orient non-metallic articles or containers having no seam, either in a labeled or in an unlabeled condition. For these other applications, it is only necessary that the article, container or labeled container: (1) has some type of a detectable reference index to ensure that the proper orientation is achieved; and (2) has an axis of rotational symmetry.

Containers 12, having an entirely random seam orientation, are delivered to a rotary transfer or infeed starwheel 17 by means of a conventional helical feedscrew 18. An arcuate infeed container guide 19 is provided, concentric with infeed starwheel 17 and spaced a predetermined distance from its outer periphery. A plurality of peripheral pockets 21 acts in conjunction with guide 19 to receive the containers, and thereafter loosely to confine and carry them in spaced relation about an arcuate path to entry station 22. At station 22, the containers are smoothly and successively transferred into a respective pocket 11 of the orienter starwheel 10.

Figure 3:
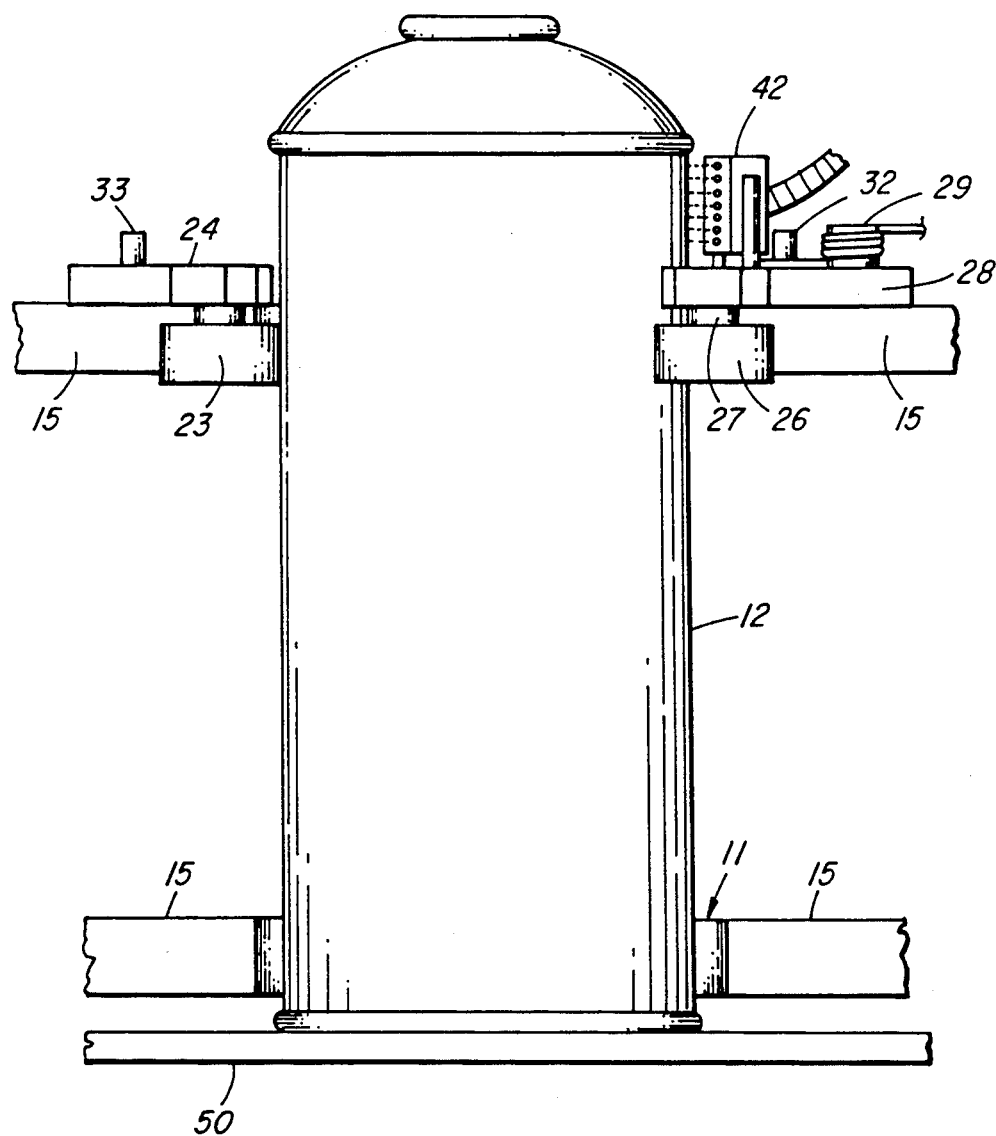
FIG. 3 is a fragmentary, side elevational view of a container and the associated electro-mechanical mechanism within a single starwheel pocket, taken along the line 3—3, shown in FIG. 2.
Figure 4:
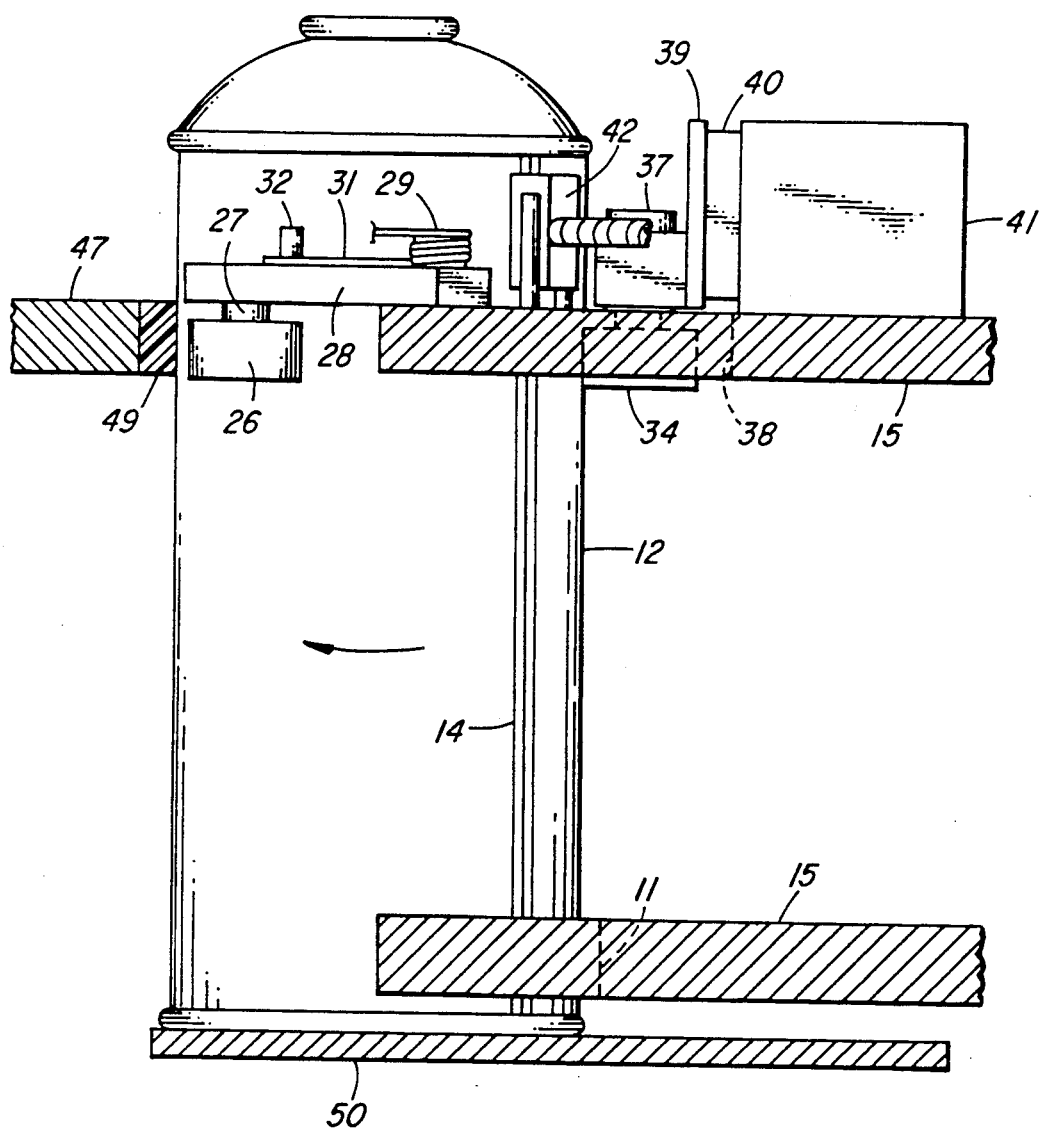
FIG. 4 is a fragmentary, side elevational view taken along the line 4—4 in FIG. 2, showing the container in a rotating condition, in full contact with the container guide sidewall.

Each of the pockets 11 has a special electromechanical mechanism to receive and then manipulate the containers 12 into proper orientation, ready for the subsequent labeling operation. As shown most clearly in FIGS. 2, 3, and 4, this mechanism includes a stationary idler roller 23, mounted for rotation and depending from a bracket 24. Bracket 24, in turn, is mounted on one outer side of the pocket 11. A pincher roller 26 is mounted for rotation on a shaft 27, depending from one end of an inwardly spring biased arm 28. The other end of arm 28 is pivotally attached to the other outer side of the pocket 11, by means of a rod 29. A torsion spring 31 has one end tensioned against pin 32, an intermediate portion wound around the upper portion of rod 29, and the other end abutting pin 33. The torsion spring 31 thereby provides an inwardly directed rotational bias upon arm 28 and roller 26.

A pusher roller 34 is mounted for rotation upon one end of a lever arm 36. An axle 37 is journalled through the median portion of arm 36, as shown most clearly in FIG. 2. A small cutout 38 is provided in upper disc 15 to accommodate roller 34 within the innermost portion of the pocket 11. A vertically extending steel foot 39 is provided on the other end of the lever arm 36, adjacent electromagnet 41. Magnetically conductive extensions 40, are included on the electromagnet 41 to ensure positive magnetic attraction of the foot 39. When the electromagnet is activated, the lever arm 36 is rotated about axle 37, radially and outwardly extending the pusher roller 34. After power is removed from the electromagnet, the foot is released from the magnetic attraction of the extensions, and the roller is caused to retract radially, as explained more fully below.

Figure 5:
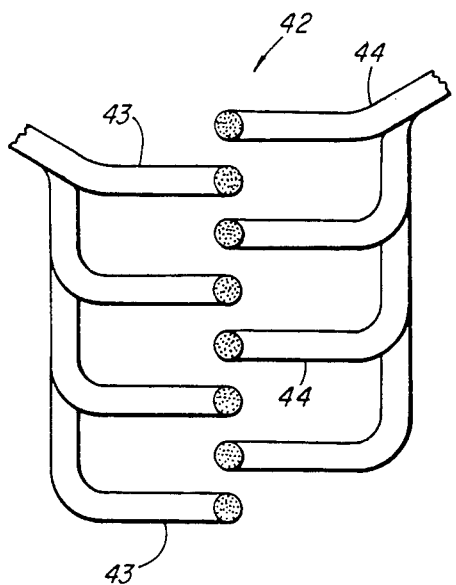
FIG. 5 is a schematic representation, taken to an enlarged scale, of the fiber optic array used to detect an index on the container sidewall.

Each pocket 11 also includes an optical detector 42, or fiber optic array, and FIG. 5 shows a schematic representation of the individual fiber optic lines in such an array. The detector 42 includes a plurality of fiber optic transmission or exposure lines 43 and a plurality of fiber optic receiving or receptor lines 44, arranged in lineal, interlaced fashion within the detector. The transmission and reception lines are respectively ganged together and fed into an illuminator and receptor housing 46, within the hub 16. Housing 46 includes a plurality of light emitting diodes (not shown) respectively mated to each line 43, and a plurality of receptor phototransistor (not shown) respectively interconnected to each line 44. Although the remotely located L.E.D.s and phototransister are used in the preferred embodiment, it may be desirable in other applications to locate these illuminator and receptor elements directly within the detector 42.

The vertical array of fiber optic transmission and receiving lines has proven uniquely well suited for reliably detecting the presence of the vertically oriented seam 14 on the container's outer sidewall. It should be noted, however, that other means for detecting indicia or an index on the container may also be employed. For example, if the container is plastic or glass, and already labeled, laser detectable markings or a magnetically detectable coating may be used as an index reference for conveying the rotational orientation of the container.

An arcuate container guide 47, concentric with the orienter starwheel 10 and spaced radially outwardly from its periphery, extends substantially from the container entry station 22 to a container discharge station 48. The primary function of the upstream portion of the guide 47 is to provide a surface against which the container can be passed to effect rotation. Toward that end, a resilient, rubber coating or strip 49 is provided along the inner wall of the container guide 47. The strip 49 provides a high coefficient of friction for effectively engaging the containers during the orientation process. The downstream portion of the guide 47, which the container does not contact, is not necessary for the proper operation of the orienter, but is included for safety purposes in the unlikely event that a container becomes prematurely dislodged from its starwheel pocket.

When a container is delivered from the infeed starwheel 17 into a pocket of the orienter starwheel 10, the container encounters the idler roller 23, the radially extended pusher roller 34, the pincher roller 26, and the rubber coating 49 on the container guide 47. A sinuous plate 50 extends from the terminus of the feedscrew 18 to a container discharge conveyor (discussed later), to provide support for the container 12 from below The spacing of the guide 47 from the pockets 11 is such that with the orienter starwheel rotating, the friction between the container and the guide wall is sufficient to spin the container about its axis of rotational symmetry. Each of the rollers 23, 26, and 34 rotates with the container, while the pusher roller 34 performs the special function of maintaining the container in frictional engagement with the guide wall.

There is a certain amount of start-up slippage between the container 12 and the container guide 47, until the spin rate of the container stabilizes at a figure determined by the orbital speed and the diameter of the container. To ensure accuracy in the operation of the orienter, it is important the container's spin rate be stabilized before any detection of the seam 14 be undertaken. Consequently, during this start-up period, the phototransistors are maintained disabled by a microprocessor 51 within the hub 16.

The microprocessor 51 is responsive to an optical encoder 52 of conventional design, located within the hub 16 and operatively connected to the shaft 13. The optical encoder 52 produces sequential pulses which correspond to the rotational period and the rotational position of the orienter starwheel 10 and the associated pockets 11. Control lines, shown in FIG. 9, interconnect the encoder 52 to the microprocessor 51 via an input/output buffer 55. Similarly, the output from the phototransistors within the illuminator and receptor housing 46 are routed through the buffer 55 to the microprocessor 51. A power driver 45, controlled by the output of the microprocessor 51, actuates and deactivates the electromagnets 41.

Figure 8:
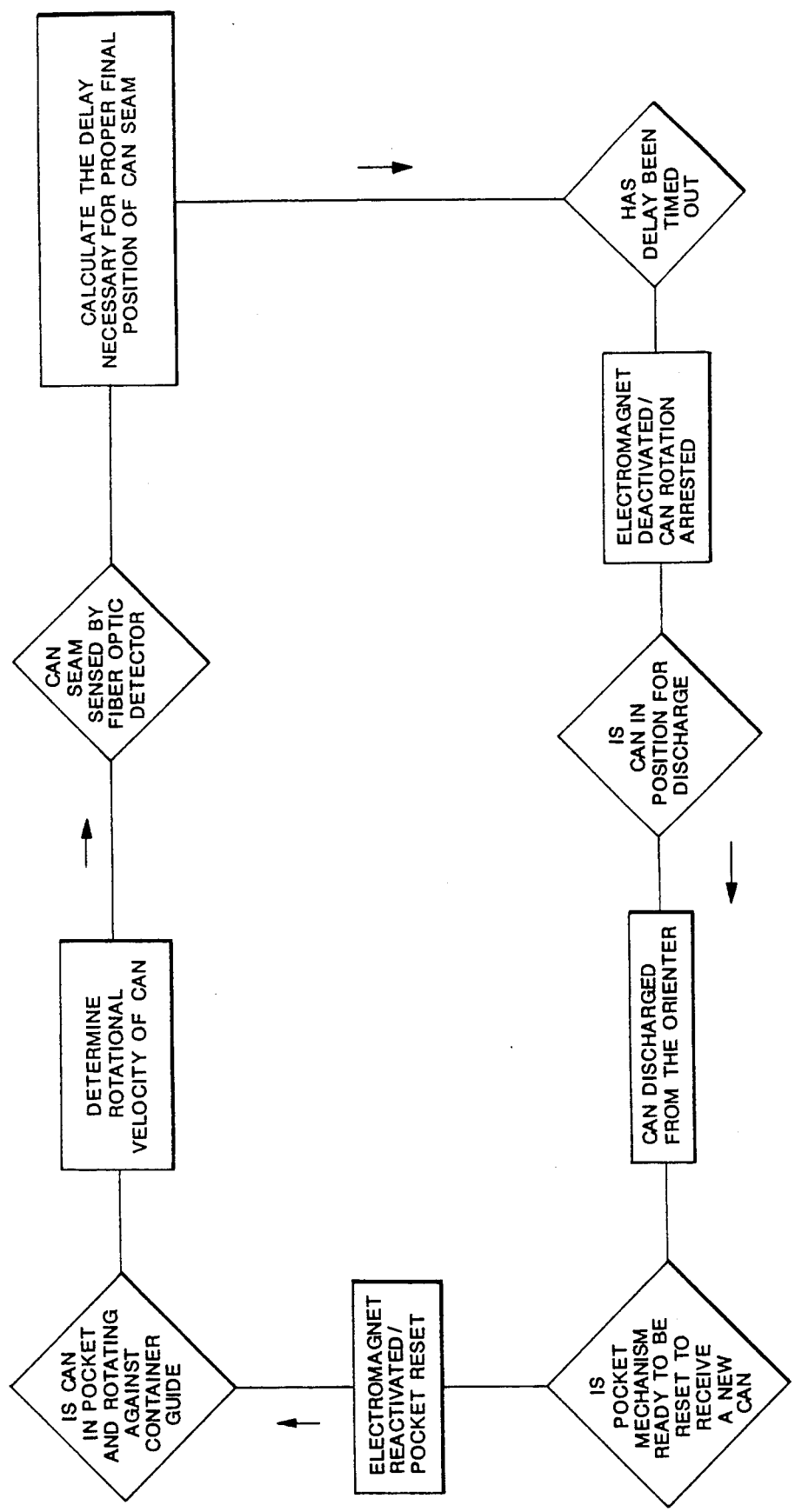
FIG. 8 is an orienter control flowchart, showing the operations occurring for each starwheel pocket during a single starwheel revolution; and, FIG. 9 is a functional block diagram of the data collection, data entry, microprocessor, and electromagnet components of the orienter.

In this manner, certain timed and synchronized operations of the electrical and mechanical devices within each pocket are automatically synchronized with the rotational position and period of the starwheel 10. FIG. 8 provides a visual summary of the logic and sequence of these various operations carried out within each pocket, throughout a complete rotational cycle of the starwheel.

It has been determined through testing, that containers being fed into the orienter starwheel 10 do not reach a stabilized rate of spin until they reach approximately a 150 degree left-handed rotational position, indicated by the numeral 53, shown in FIG. 1. After a container has reached this 150 degree position and attained a stabilized rate of spin, the optical receptor is enabled by the microprocessor 51.

With continued rotation of the container, the next pass of the container seam, or other indicia, is sensed and a control pulse is produced. This event is shown in FIG. 1 to have occurred at approximately a 180 degree left-handed rotational position, indicated by the numeral 54. The precise location where the control pulse will be produced in each case will vary depending on the random incoming location of each can seam.

This control pulse is delayed a calculated amount of time by electronic compensation circuitry, associated with the microprocessor 51. Depending upon a several programmable and operationally determined factors, the compensation circuitry appropriately advances or retards the action of the electro-mechanical mechanisms effecting rotation and subsequent braking of the containers.

Figure 6:
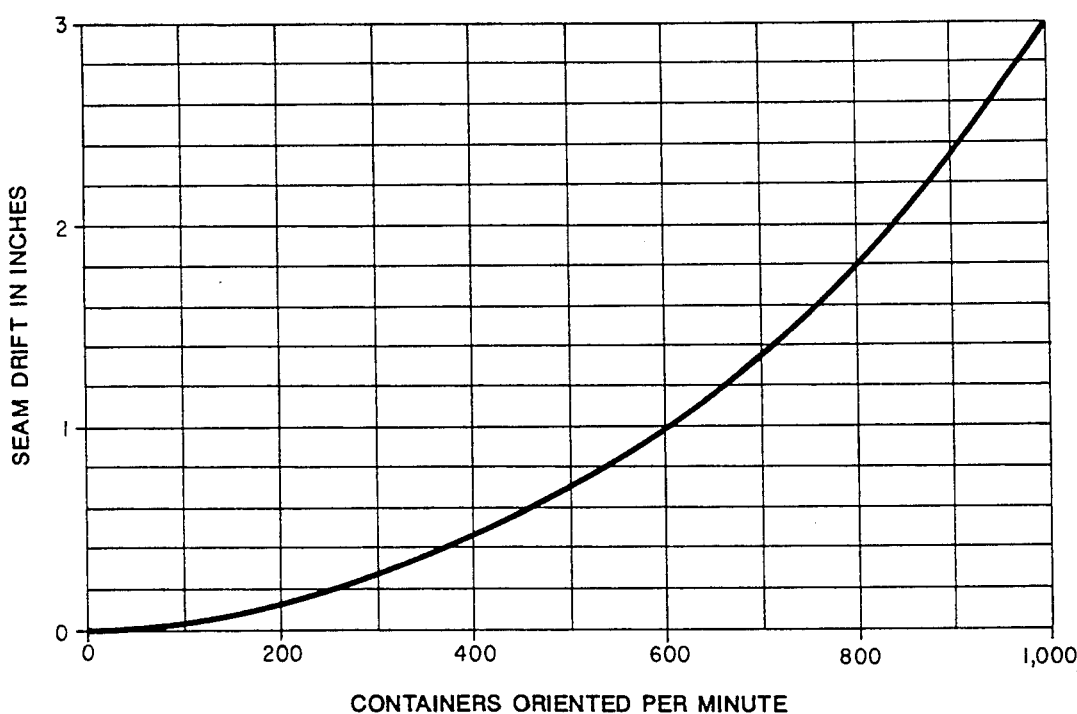
FIG. 6 is a graph depicting the seam drift, or seam misorientation, in inches as a function of orienter speed in cans per minute, for the present container orienter, without benefit of the speed compensation circuitry.

By sampling the frequency of the pulses provided by the optical encoder 52, or tachometer, the compensation circuitry enables the orienter to operate accurately and consistently over a wide range of speeds. The need for providing compensation circuitry during high speed orienter operation is best illustrated in FIG. 6. The graph in FIG. 6 shows seam drift as a function of cans per minute, for the described orienter without benefit of the electronic compensation circuitry also described herein.

Seam drift is the distance along the circumferential periphery of the container that the seam position varies from the idealized desired position, established at a low orienter operating speed. As the speed of operation of the orienter increases in cans per minute, the seam drift also increases, particularly at the highest speeds. By using the compensation circuitry disclosed herein, the seam drift can be reduced to a negligible amount, even at very high speeds, such as 800–1000 cpm.

This same compensation circuitry can also be used to incorporate the proper delay in the operation of the electro-mechanical mechanism, to adjust for variables introduced by empty containers, full containers, and the viscosity of the contents of full containers. Filled containers act differently than empty cans when subjected to the orientation process, as additional inertia forces introduced by the contents, resist both the spinning and the braking action.

The viscosity of the contents also affects the ability of the orienter mechanism to spin and brake the container. It has been determined that the increased coefficient of friction between highly viscous contents and the container wall and floor couples the inertia of the contents to the container very effectively. The converse is true with low viscosity contents, such as juice, having a lesser ability to couple the inertia of the fluid to the container. In general, then, containers filled with highly viscous contents take more time to reach a stabilized spinning rate and to slow to a stop, than containers having contents with a low viscosity.

The proper amount of delay to be introduced must first be calculated by the compensation circuitry within the microprocessor, and then applied to the control signal as it is received. The calculated delay is dependent upon the desired final orientation of the container seam, as well as the rotational speed of the orienter starwheel 10, provided by the encoder 52. It should be noted that the rotational speed or rotational velocity of the containers is proportional to the rotational speed of the starwheel 10. Thus, the data provided by encoder 52 can be used by the speed compensation circuitry to make appropriate adjustments for variances in the rotational velocity of the containers.

The formula for the time delay is:

$$t = Kp - T - C/p$$

where,
K is a constant that determines the desired orientation of the seam;
p is the period of rotation of the orienter starwheel;
T is a constant that compensates for the mechanical reaction time of the braking mechanism; and,
C is a constant that compensates for any speed dependent slippage in braking and reaccelerating (where applicable) the oriented container.

and, the product Kp must be a value larger than $(T + C/p)$ at all working speeds of the orienter.

Figure 7:
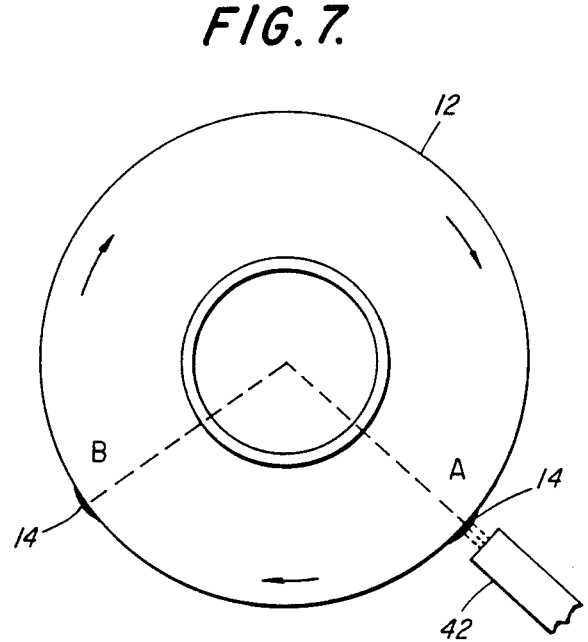
FIG. 7 is a top plan view of a container, showing the seam in a first position A, where it is sensed by the detector, and then in a second position B, after rotation of the container has been arrested

This formula is derived as explained below, making particular reference to FIG. 7. With the container 12 rotating at a stabilized speed, the can seam 14 is sensed by the fiber optic array 42 at position A. Position B is the desired final orientation of the seam 14, with the container's rotation fully arrested. Position B cannot be chosen entirely arbitrarily. It must be at least as far away from position A, along a circumferential arc, as the maximum distance for can seam drift shown in FIG. 6. As will be explained more fully below, it is this distance which allows for speed compensation at the highest operating speed of the orienter. In fact, when the orienter is operating at maximum speed, the braking mechanism must be engaged when the container seam is at position A, for the container seam to achieve the desired at rest orientation at position B.

At any particular speed of rotation of the container, it takes t seconds for the can seam to rotate between points A and B. This time t would be inversely proportional to the rpm of the can.

The basic formula describing this relationship is:

$$t = k/\text{rpm} \text{ (k being a constant)}$$

At very high speeds, the microprocessor must ensure that the braking mechanism is engaged a very short time after the seam passes point A. However, at low speeds, the mechanical reaction time of the braking mechanism is relatively small, compared to the speed of rotation, so the brake would not need to be engaged until just before the seam reaches position B.

It is evident from the graph of seam drift shown in FIG. 6, that the overall action of the braking mechanism is not linear with speed. However, as a starting point in deriving the correct formula, a linear relationship can be assumed simply by having the brake mechanism engage when the can is a distance before position B, proportional to the container's rpm. In other words, at slow speed the brake should be engaged when the seam is almost at position B; at high speed it should be engaged closer to position A; and at an intermediate speed it should be engaged at a position midway between A and B.

As t is the time it takes for the can to rotate from position A to position B at any speed, the brake should always be engaged in less than t seconds, after the seam is detected at A. An equation to represent this delay in seconds would be:

$$t[1 - \text{rpm}/(\text{max rpm})]$$

With this equation, if the can were ever rotating at the value established as "max rpm", the brake would be actuated at the same moment the seam was detected.

Since $t = k/\text{rpm}$, $\text{rpm} = k/t$, so the delay after detecting the seam at position A would be:

$$t(1 - k/(\text{max rpm} \times t)) = t - k/(\text{max rpm}) = t - T$$

where, $T = k/(\text{max rpm})$

This constant T corresponds to the mechanical reaction time of the braking mechanism. If there were no slippage between the container and the braking mechanism once it was engaged, this would be the only compensation needed.

Returning again to FIG. 6, it appears that the curve depicted in the graph is generally quadratic in shape, with respect to speed. Thus, a compensating factor is needed to account for the braking action, and that factor must have a term proportional to the can's rpm. If the mechanical reaction time T is ignored for the moment, the following delay formula would apply:

$$\text{delay} = t(1 - C1 \times \text{rpm}^2)$$

... where C1 is a constant and $C1 \times \text{rpm}^2$ is negligible at low speeds.

Therefore, as the can speed in rpm increases, the correction factor would increase quadratically. But the compensation circuitry in effect samples the period of rotation p of the container, (not the rpm), through the use of the starwheel optical encoder 52. And, since the period p is inversely proportional to rpm, the formula must be combined to form a new constant C2:

$$\text{delay} = t(1 - C2/p^2) = t - t(C2/p^2)$$

As t is proportional to p, yet another constant $C = C2(t/p)$ can be made. By substituting, we get:

$$\text{delay} = t - C/p$$

By including the mechanical reaction time T to the formula, we get:

$$\text{delay} = t - T - C/p$$

As t, the time it takes the container to rotate to the desired position, is proportional to p, the delay necessary to get the can to the desired stopping point compensating equation can be written as:

$$\text{delay (after seam is detected)} = Kp - T - C/p$$

In this formula, K is the constant that adjusts the final orientation of the seam with respect to the fiber optic array, as well as providing for the needed speed compensation. Accordingly, K is a function of the physical layout of the orienter, and is independent of the container weight or product viscosity. T is the mechanical reaction time of the particular braking mechanism, dependent among other things, upon torsion spring tension, frictional resistance among moving parts, and manufacturing tolerances. C is the constant that adjusts for slippage between the container and the brake pad, during the braking process. It should also be noted that any slippage that occurs upon reaccelerating the container to spin once again, could also be compensated for by the constant C.

The curve shown in FIG. 6, representing seam drift as a function of orienter operational speed, is essentially the non-linearity that $T + C/p$ compensates for, in the final equation. So, by subtracting those values from Kp, a constant final position over a range of speeds can be established.

In addition to speed, other factors play a part in affecting the value of constant T. For example, a container filled with product will require a larger value of constant T than an empty container, as the additional weight will slow down the mechanical reaction time of the container being acted upon by the braking mechanism.

However, it has been determined that a container filled with a non-viscous substance will slip less within the braking mechanism than an empty container. It is believed that this results from the fluid's inability to accelerate fully to the stabilized rotational velocity of the container achieved before braking. Thus, the internal substance acts as an internal brake to aid in stopping the can's rotation, making the value of constant C for a container so filled less than the value for an empty can.

Conversely, a container filled with a very viscous product has a high degree of frictional coupling between the substance and the container's inner walls. With such product and the container rotating at the same speed, the combined rotational momentum causes more slippage within the braking mechanism. Consequently, a container filled with very viscous substance requires a value of constant C much higher than that for an empty container.

Returning now to the operation of the preferred embodiment of the invention, the desired orientation of the container places the seam slightly clockwise from a tangency drawn to the outer periphery of the container. This orientation is shown in FIGS. 1 and 2, and is indicated by the reference numeral 56. For different orienter applications, of course, the final container orientation may be adjusted as needed by entering appropriate data into the programmable memory of the compensation circuitry.

Similarly, different values for the other constants used in the delay calculation are entered into programmable memory, as well. For this purpose, keyboard 57 and display readout 58 are provided. It should be noted that individual data entries are made for each of the twelve electronics channels, handling the operation for its respective starwheel pocket. In this way, a constant may be entered that compensates for the characteristics of the particular braking mechanism for each pocket. Furthermore, the entry of this constant may be made "on the fly", while the orienter is operating, for the most accurate settings possible.

The rotational speed, or period, of the orienter starwheel 10 is provided by the optical encoder 52, as discussed previously. With this data, the microprocessor calculates the proper delay, applies it to the control signal, and then passes the delayed signal to the power driver, controlling each of the twelve electromagnets sequentially and individually.

Making particular reference to FIG. 2, the deactivation of electromagnet 41 frees the lever arm 36 for rotation about axle 37, under the inwardly directed bias applied by pincher roller 26. The spinning container 12 is caused to shift inwardly and away from container guide 47, quickly coming into frictional contact with a brake pad 61. Further rotation of the container is quickly arrested, and the seam is now located in the desired position 56. Accordingly, the container 12 depicted in the right hand portion of FIG. 2 is shown fully arrested against the pad 61, and in proper orientation.

The container 12 is passed farther along in its orbital path to the container discharge station 48, where it tangentially encounters a rotary vacuum drum 62. Simultaneously, the upstream portion of an arcuate roll-on pad 63 begins to pull the container 12 out of its pocket and against the periphery of the vacuum drum 62. The roll-on pad 63 includes a resilient rubber surface 64, to cushion the container and to provide a highly frictional surface against which the container will roll. The frictional forces between the container and the vacuum drum cause the container to rotate once again.

Owing to a certain degree of initial slippage, the container does not immediately reach the same rotational speed as the vacuum drum 62. However, it is desirable that these rotational speeds be matched as nearly as possible at the moment the container comes into contact with label 66 on the surface of the vacuum drum. Near matching of these rotational speeds will reduce the possibility of unwanted shearing or tearing action between the leading end of the label and the container at the moment of contact.

In furtherance of this objective, the seam 14 is oriented slightly clockwise from a true tangential position, so that by the time the container reaches substantially the same speed as the vacuum drum, it is the seam 14 that comes into contact with the adhesively treated leading end of the label 66. The label 66 is picked up from the surface of the vacuum drum, and drawn around the rotating container a shown in FIG. 1. A solvent or an adhesive, previously applied to the trailing end 68 of the label, secures the trailing end over the leading end and the underlying seam, completing the labeling process. The labeled containers are carried away by means of a conveyor 69, to be packaged or boxed.

Suitable labeling apparatus which includes the above discussed elements in combination, is disclosed in greater detail in U.S. Pat. No. 4,844,760 issued to Dickey, and incorporated herein by reference.

The pocket of the orienter starwheel 10 which just released the container to the labeling apparatus must be prepared to receive another container before it reaches the entry station 22. To that end, the optical encoder 10 provides data to the microprocessor which confirms that the pocket has reached an electromagnet reset position 71. This position, shown in FIG. 1, is at a left handed rotational position of approximately 40 degrees, after the pocket has left the container discharge station 48 but well before the pocket reaches the entry station 22.

The power driver controlling the electromagnet 41 is again energized, and the electromagnet is reactivated, or reset. Foot 39 is again attracted to and held firmly by the electromagnet, rotating the lever arm 36 and the pusher roller 34 into a radially extended position. The reset pocket 11 is now ready to receive its next container, and continue the above-described orientation process.

What is claimed is:

1. An apparatus for orienting rotationally symmetrical containers having a reference index thereon into a predetermined orientation, comprising:
   a. means for rotating a container about its axis of symmetry until it reaches a stabilized rotational velocity;
   b. a detector for sensing the index after the container reaches said velocity, and producing a control signal in response thereto;
   c. tachometer means to determine the rotational velocity of the container;
   d. means responsive to said control signal, for arresting the container with its reference index in the predetermined orientation; and
   e. delay means responsive to said tachometer means, for delaying said control signal delivered to said arresting means by an amount of time inversely proportional to said rotational velocity, and for decreasing said amount of time by an increment directly proportional to said rotational velocity, to compensate for slippage between the container and said arresting means.

2. An apparatus as in claim 1 in which said delay means further includes means to decrease said amount of time by a period equal to the response time of said container arresting means.

3. An apparatus for orienting rotationally symmetrical containers having a reference index thereon into a predetermined orientation, comprising:
   a. means for rotating a container about its axis of symmetry until it reaches a stabilized rotational velocity;
   b. a detector for sensing the index after the container reaches said velocity, and producing a control signal in response thereto;
   c. tachometer means to determine the rotational velocity of the container;
   d. means responsive to said control signal, for arresting the container with its reference index in the predetermined orientation; and,
   e. delay means responsive to said tachometer means, for delaying said control signal delivered to said arresting means by an amount of time by an increment directly proportional to a non-linear function of said rotational velocity, to compensate for slippage between the container and said arresting means.

4. An apparatus as in claim 3 in which said delay means further includes means to decrease said amount of time by a period equal to the response time of said container arresting means.

5. An apparatus for orienting containers having an orientation index reference thereon, comprising:
   a. rotary means for passing the containers through an orbital path about an axis, said rotary means having at least one peripheral pocket for engaging and conveying a container;
   b. infeed means for successively delivering the containers into said peripheral pocket at an upstream entry station;
   c. an arcuate guide, concentric with and spaced radially outwardly from the periphery of said rotary means, said guide extending substantially from said entry station to a downstream discharge station;
   d. a detector adjacent said pocket, for sensing the index on the container after it leaves said entry station, and producing a control signal in response thereto;
   e. means adjacent said pocket for maintaining the container in a first radially extended position in rolling engagement with an upstream portion of said arcuate guide for rotating the container about its axis, and then for moving the container in response to said control signal to a second radially withdrawn position, spaced from a downstream portion of said arcuate guide and against a brake pad, for arresting the container in an oriented position; and,
   f. means for extracting the container from said pocket, when the container reaches said discharge station.

6. An apparatus as in claim 5 wherein said means adjacent said pocket includes:
   a. a stationary idler roller mounted on one outer side of said pocket;
   b. a pincher roller mounted on an inwardly spring biased arm, pivotally mounted on the other outer side of said pocket;
   c. a pusher roller located within the pocket, said pusher roller being mounted for movement from said first radially extended position against the container to said second radially withdrawn position under the inwardly directed pressure applied by said pincher roller against the container.

7. An apparatus as in claim 6 in which said pusher roller is positioned on one end a pivotally mounted lever arm, the other end of the lever arm being magnetically attracted by an electromagnet, said electromagnet being responsive to said control signal.

8. An apparatus as in claim 5, in which said detector includes a fiber optic array having a plurality of fiber optic transmission lines and a plurality of fiber optic receiving lines, said transmission and receiving lines being arranged in lineal, interlaced fashion, and directed toward the container.

9. An apparatus as in claim 8, further including a plurality of light emitting diodes respectively mated to each transmission line, and a plurality of receptor phototransistors respectively interconnected to each receiving line.

10. An apparatus as in claim 5, in which said rotary means includes an orienter starwheel, having a plurality of container pockets spaced around its periphery, said orienter starwheel being mounted for rotation about a central shaft coincident with said axis.

11. An apparatus as in claim 10, in which said infeed means includes a rotary infeed starwheel and an arcuate infeed container guide concentric with said infeed starwheel and spaced from its outer periphery, said infeed starwheel and infeed container guide being adapted to confine and carry the containers in spaced relation to said entry station, for transfer to a respective said pocket of said orienter starwheel.

12. An apparatus as in claim 11 having a helical feedscrew delivering containers successively and in spaced relation to a receiving station adjacent said infeed starwheel.

13. An apparatus as in claim 5, including a rotary vacuum drum adjacent said discharge station for tangential encounter by the containers, said vacuum drum carrying labels on its outer periphery prepared for application to a respective container, and in which said means for extracting the containers comprises an arcuate roll-on pad substantially concentric with said vacuum drum, said roll-on pad further being spaced from the periphery of said vacuum drum so as to effect rotation of the containers as they are extracted from a pocket and drawn against said periphery.

14. An apparatus as in claim 5, in which the containers are metal, and in which a sidewall seam of the container provides an index reference for determining container orientation.

15. An apparatus as in claim 5, in which the containers are labeled, and in which the label includes an index reference on its surface for determining container orientation.

16. An apparatus, as in claim 5, including means for disabling said detector until the container reaches a stabilized spin rate;

17. An apparatus as in claim 16, including means for determining the rotational speed of said rotary means and delaying said control signal in response thereto, so that the container is arrested in the desired orientation.

18. An apparatus for orienting containers having an orientation index reference thereon, comprising:
 a. rotary means for passing the containers through an orbital path about an axis, said rotary means having at least one peripheral pocket for engaging and conveying a container;
 b. infeed means for successively delivering the containers into said peripheral pocket at an upstream entry station;
 c. an arcuate guide, concentric with and spaced radially outwardly from the periphery of said rotary means, said guide having an upstream portion adjacent said entry station;
 d. means adjacent said pocket for maintaining the container in a first radially extended position in rolling engagement with said upstream portion of said arcuate guide for rotating the container about its axis;
 e. encoder means for determining the period of said rotary means;
 f. calculator means responsive to said encoder means for determining a compensation value inversely proportional to the speed of said rotary means;
 g. a detector adjacent said pocket, for detecting the index after the container reaches a stabilized rotational speed, and producing a control signal in response thereto;
 h. a microprocessor, responsive to said calculator means, adapted to delay said control signal in accordance with said compensation value;
 i. means for moving the container in response to said delayed control signal to a second radially withdrawn position, spaced from a downstream portion of said arcuate guide and against a brake pad, for arresting the container in an oriented position.

19. A method for orienting a container having an orientation index reference thereon, comprising:
 a. passing a container through a path, from an entry station to a discharge station;
 b. rotating the container about its axis, after it leaves the entry station, until it reaches a stabilized rate of rotation;
 c. detecting the index on the container, and producing a control signal in response thereto;
 d. determining the rotational speed of the container, and producing a compensation value directly proportional to a non-linear function of said rotational speed, in response thereto;
 e. providing means for arresting further rotation of the container;
 f. delaying said control signal by said compensation value, to compensate for slippage between the container and said arresting means, and arresting further rotation of the container in response to the delayed control signal;
 g. removing the container from said path after it reaches said discharge station.

20. An apparatus for orienting rotationally symmetrical containers having a reference index thereon into a predetermined orientation, comprising:
 a. means for rotating a container about its axis of symmetry until it reaches a stabilized rotational velocity;
 b. a detector for sensing the index after the container reaches said velocity, and producing a control signal in response thereto;
 c. tachometer means to determine the rotational velocity of the container;
 d. means responsive to said control signal, for arresting the container with its reference index in the predetermined orientation; and,
 e. delay means responsive to said tachometer means, for delaying said control signal delivered to said arresting means by an amount of time inversely proportional to said rotational velocity, and for decreasing said amount of time by an increment directly proportional to the square of said rotational velocity, to compensate for slippage between the container and said arresting means.

* * * * *